United States Patent [19]
Craddock

[11] Patent Number: 5,395,091
[45] Date of Patent: Mar. 7, 1995

[54] TOOL AND METHOD FOR INSTALLING A CABLE

[76] Inventor: Gary D. Craddock, 4942 Commonwealth Dr., Sarasota, Fla. 34242

[21] Appl. No.: 114,008

[22] Filed: Aug. 30, 1993

[51] Int. Cl.⁶ ............................................. B65H 59/00
[52] U.S. Cl. ................................................ 254/134.3 FT
[58] Field of Search ............... 254/134.3 FT, 134.3 R, 254/134.4; 15/104.33; 403/296, 299, 343, 301, 307, 274

[56] References Cited

U.S. PATENT DOCUMENTS

| | | | |
|---|---|---|---|
| 2,509,100 | 5/1950 | Jordan | 254/134.3 FT |
| 2,980,398 | 4/1961 | Raney et al. | 254/134.3 FT |
| 4,386,800 | 6/1983 | Stegall . | |
| 4,432,663 | 2/1984 | Lasak et al. | 254/134.3 FT |
| 4,684,161 | 8/1987 | Egner et al. . | |
| 4,736,978 | 4/1988 | Cielker | 254/134.3 FT |

Primary Examiner—Robert C. Watson
Attorney, Agent, or Firm—Charles J. Prescott

[57] ABSTRACT

A tool and method for installing electrical cable into an elongated tubular conduit by pushing the cable through the conduit. The tool includes a nose piece having a rounded forward distal end, a tail piece also having a rounded forward end and a semi-flexible slender intermediate member connected therebetween. At rest, the tool is preferably straight and cylindrical. In use, the tail piece is threadably engaged onto a lead end of the cable to be installed and then pushed into the conduit. Continuing to push the cable into the conduit, the nosepiece guides the tool past any irregularities on the interior surface of the conduit and around conduit bends, facilitated by the flexing of the intermediate member.

7 Claims, 1 Drawing Sheet

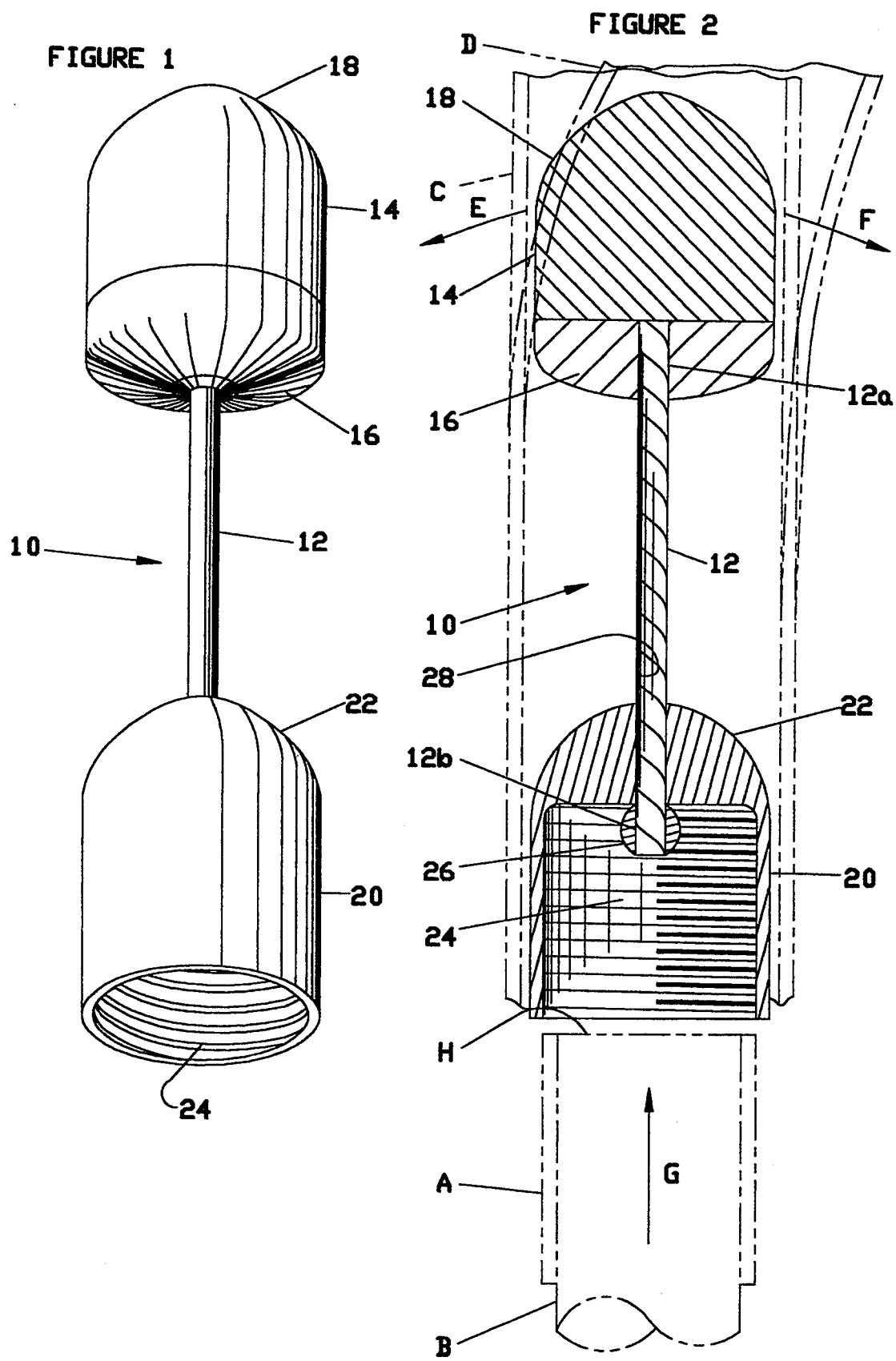

TOOL AND METHOD FOR INSTALLING A CABLE

BACKGROUND OF THE INVENTION

SCOPE OF INVENTION

This invention relates generally to the installation of electrical cable into an in-place tubular protective conduit, and more particularly to a tool and method which facilitates pushing the electrical cable into and through the conduit.

PRIOR ART

In placing electrical cable either into a building or into the ground for use in transmitting an electrical signal or electrical power, the cable is typically installed into a protective tubular conduit. The conduit is first deployed either within the building or into the ground and, thereafter, the electrical cable must then be installed into the conduit.

The electrical cable may either be pushed or pulled through the conduit. This process is inhibited by both discontinuities in the interior wall surface of the conduit due to joints and other obstacles, as well as by arcuate bends formed as the conduit is deployed.

Applicant is aware of a tool for pulling cable through a hole in the wall where the wall thickness is much greater than the diameter of the hole as disclosed in U.S. Pat. No. 4,386,880 invented by Stegall. However, this device appears inappropriate for passing an electrical cable through a conduit wherein the conduit is likely to have a length of 50 to 100 feet or more.

Another device known to applicant is disclosed in U.S. Pat. No. 4,684,161 invented by Egner which teaches a pulling "bullet" for routing an optical fiber cable assembly along a confined passageway. This device is threadably engagable into a connector which forms a distal end of the optical cable to be routed.

There is obviously an advantage to pushing the electrical cable through the conduit in that a pulling procedure requires that a separate member be first inserted fully through the conduit before it can then be utilized to pull the electrical cable back therethrough. The present invention provides a tool and method which facilitates the pushing procedure greatly. It is threadably connectable onto the lead end of the electrical cable and then serves as a guide to lead the cable through the conduit as the cable is pushed by the installer. The device is structured to avoid minor obstructions such as joints and seams within the conduit and also structured to facilitate easily negotiating curves formed in the conduit itself.

BRIEF SUMMARY OF THE INVENTION

This invention is directed to a tool and method for installing electrical cable into an elongated tubular conduit by pushing the cable through the conduit. The tool includes a nose piece having a rounded forward distal end a tail piece also having a rounded forward end and a semi-flexible slender intermediate member connected therebetween. At rest, the tool is preferably straight and cylindrical. In use, the tail piece is threadably engaged onto a lead end of the cable to be installed and then pushed into the conduit. Continuing to push the cable into the conduit, the nosepiece guides the tool past any irregularities on the interior surface of the conduit and around conduit bends, facilitated by the flexing of the intermediate member. The nosepiece may then be grasped as it exits the other end of the conduit to pull the device from the conduit.

It is therefore an object of this invention to provide a tool connectable onto a lead end of a length of electrical cable to facilitate the pushing mode of installing the cable into a protective tubular conduit.

It is yet another object of this invention to provide a method of push installing electrical cable into a protective tubular conduit.

It is yet another object of this invention to provide an easily installable and economical tool for facilitating the installation of electrical cable into a protective conduit already in place.

In accordance with these and other objects which will become apparent hereinafter, the instant invention will now be described with reference to the accompanying drawings.

BRIEF DESCRIPTION OF THE DRAWINGS

FIG. 1 is a perspective view of the invention.

FIG. 2 is a longitudinal section view of the invention showing both electrical cable and tubular conduit in phantom.

DETAILED DESCRIPTION OF THE INVENTION

Referring now to the drawings, the invention is shown generally at numeral 10 and includes an intermediate slender semi-flexible member 12 which may be formed of either steel or fiberglass cable or the like. This intermediate member 12 is preferably incompressible, having a straight at-rest position shown.

A nosepiece 14 is rigidly connected onto one end of the intermediate member 12 at 12a. This nosepiece 14 includes a rounded distal leading end 18 and a rounded trailing end 16. The central portion of the nosepiece 14 is cylindrical, having a diameter slightly less than an interior diameter of a length of conduit C through which the tool 10 will be passed.

A tailpiece 20 is connected at the opposite end intermediate member 12 having a cylindrical outer diameter equal to that of the nosepiece 14. The tailpiece 20 includes a rounded forwardly end 22 which faces the nosepiece 14. The main body of the tailpiece 20 is defined by an interior threaded cavity 24. Intermediate member 12 passes through an axial hole 28 formed through the rounded forwardly end 22 so that the tailpiece 20 is free to rotate with respect to intermediate member 12. A stop 26 is welded or staked onto surface 12b of the end of the intermediate member 12 so as to prevent withdrawal or separation of the intermediate member 12 from the tailpiece 20.

The threaded cavity 24 is preferably sized for threadable engagement onto a plastic insulating sleeve or cover A disposed on the outer surface of a length of electrical cable B. By taking advantage of the pliability of this plastic outer sleeve, threadable engagement between the lead end of the electrical cable B and the threaded cavity 24 is facilitated and made more positive.

Once the electrical cable B is fully threaded and engaged into threaded cavity 24, the end surface H of the electrical cable B presses against the stop 26 and distal end of intermediate member 12 so as to prevent any relative axial movement between the intermediate member 12 and the tailpiece 20.

Once threadably engaged into threaded cavity 24, the electrical cable B may then be manually urged by pushing the cable B in the direction of arrow G so as to move the device 10 through the tubular conduit C. The rounded ends 16, 18 and 22 are provided so as to facilitate overcoming any irregularities or obstructions which are encountered on the interior surface of the conduit C. In addition, the rounded trailing end 16 facilitates reversed withdrawal by pulling the cable B back out should too large an obstruction be encountered within the conduit C.

In addition, in almost all installations of the conduit C, bends D are necessary and must be negotiated to complete the installation of the electrical cable. This is where the semi-flexible characteristics of intermediate member 12 come into play. Nosepiece 14 will flex or move in either direction of arrows E or F with respect to tailpiece 20, depending upon the direction of curvature D of conduit C. This flexing movement of the nosepiece 14 is facilitated by the semi-flexible nature of intermediate member 12 and by having the intermediate member 12 incompressible, kinking and excessive bending is avoided. Moreover, as the nosepiece 14 is displaced laterally by the conduit bend D, the tailpiece 20 is also cocked slightly in the same direction which further smoothes the movement of the device 10 along the conduit C.

By continuing to forcibly push the electrical cable B in the direction of arrow G, the entire length of conduit C may be fully negotiated so that the device 10 will then exit the opposite end of the conduit C with the electrical cable B still fully engaged within threaded cavity 24. Removal of the device 10 by grasping and pulling the nosepiece 14 then allows the installer to complete the installation wiring procedure.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A tool for installing electrical cable into a tubular conduit by pushing the cable entirely through the conduit the conduit being substantially longer than said tool, comprising:
    an intermediate member consisting only of a length of semi-flexible cylindrical Cable having a relaxed straight configuration;
    a nosepiece connected at one end of said intermediate member, said nosepiece having a rounded forwardly ricing distal end and a transverse size smaller than an interior transverse dimension of the conduit for free slidable passage of said tool through the conduit;
    a tailpiece connected at the other end of said intermediate piece, said tailpiece having a forwardly facing rounded end which faces said nosepiece and a transverse size smaller than an interior transverse dimension of the conduit;
    said tailpiece also having an internally threaded rearwardly facing open distal end;
    said threaded distal end sized to be temporarily threadably secured onto a lead end of a length of electrical cable to be pushed through the conduit;
    said intermediate member having a transverse size substantially smaller than said transverse sizes of said nosepiece and said tailpiece.

2. A tool as set forth in claim 1, wherein:
    said intermediate member, said nosepiece and said tailpiece have cylindrical outer surfaces and are coaxially arranged.

3. A tool as set forth in claim 2, wherein:
    said nosepiece and said tailpiece are of a common outer diameter.

4. A tool as set forth in claim 1, wherein:
    said nosepiece has a rearwardly facing rounded end which faces said tailpiece.

5. A tool as set forth in claim 1, wherein:
    said intermediate member is slidably connected to said tailpiece through an axial hole formed through said tailpiece forwardly facing end wherein said tailpiece is rotatable with respect to said intermediate member to facilitate threadable engagement of said tailpiece over the lead end of the electrical cable;
    said intermediate member including a stop member connected at a rearward distal end thereof, said stop preventing withdrawal of said intermediate member from said tailpiece axial hole;
    said stop member being held against a rearward end of said axial hole when the lead end of the electrical cable is fully threadably engaged into said tailpiece open distal end.

6. A tool as set forth in claim 1, wherein:
    said tailpiece threaded distal end is sized for threadable engagement onto a protective plastic tubular sheath covering the electrical cable.

7. A method of installing electrical cable through a tubular conduit, the steps consisting essentially of:
    A. threadably engaging a tool onto a lead end of said electrical cable, said tool comprising:
        an intermediate member having a relaxed straight configuration consisting only of an elongated slender semi-flexible length of cable;
        a nosepiece connected at one end of said intermediate member, said nosepiece having a rounded forwardly facing distal end and a transverse size smaller than an interior transverse dimension of the conduit for free slidable passage of said tool through said conduit;
        a tailpiece connected at the other end of said intermediate piece, said tailpiece having a forwardly facing rounded end which faces said nosepiece and a transverse size smaller than an interior transverse dimension of the conduit;
        said tailpiece also having an internally threaded rearwardly facing open distal end;
        said threaded distal end sized to be temporarily threadably secured onto a lead end of a length of electrical cable to be pushed through the conduit;
        said intermediate member having a transverse size substantially smaller than said transverse sizes of said nosepiece and said tailpiece;
    B. pushing said tool into an open end of said conduit;
    C. continuing to push said tool through the entire length of said conduit by pushing said electrical cable into said conduit open end until said tool exits from the other open end of said conduit;
    D. threadably removing said tool from said electrical cable lead end.

* * * * *

UNITED STATES PATENT AND TRADEMARK OFFICE
CERTIFICATE OF CORRECTION

PATENT NO. : 5,395,091
DATED : March 7, 1995
INVENTOR(S) : Gary D. Craddock

It is certified that error appears in the above-identified patent and that said Letters Patent is hereby corrected as shown below:

Column 3, line 54, replace "ricing" with -- facing --.

Signed and Sealed this

Ninth Day of May, 1995

Attest:

BRUCE LEHMAN

Attesting Officer

Commissioner of Patents and Trademarks